United States Patent
Suzuki

(10) Patent No.: US 7,183,341 B2
(45) Date of Patent: Feb. 27, 2007

(54) ANTISTATIC AGENT FOR SYNTHETIC POLYMER MATERIALS AND SYNTHETIC POLYMER COMPOSITIONS COMPRISING SAME

(75) Inventor: Masahiro Suzuki, Gamagori (JP)

(73) Assignee: Takemoto Yushi Kabushiki Kaisha, Aichi (JP)

( * ) Notice: Subject to any disclaimer, the term of this patent is extended or adjusted under 35 U.S.C. 154(b) by 335 days.

(21) Appl. No.: 10/842,027

(22) Filed: May 6, 2004

(65) Prior Publication Data

US 2005/0090588 A1   Apr. 28, 2005

(30) Foreign Application Priority Data

Oct. 28, 2003   (JP) .............................. 2003-366797

(51) Int. Cl.
*D06M 11/00* (2006.01)
*C08K 5/49* (2006.01)
*C08K 5/50* (2006.01)
*C08K 5/51* (2006.01)
*C08K 3/10* (2006.01)

(52) U.S. Cl. ...................... 524/154; 524/157; 524/158; 524/912; 252/8.81

(58) Field of Classification Search ................ 524/154, 524/157, 158, 912; 252/8.81
See application file for complete search history.

(56) References Cited

U.S. PATENT DOCUMENTS 4,943,380 A * 7/1990 Sugiura et al. ............. 524/154
6,225,386 B1 * 5/2001 Suzuki ....................... 524/154

* cited by examiner

*Primary Examiner*—Kelechi C. Egwim
(74) *Attorney, Agent, or Firm*—Beyer Weaver LLP

(57) ABSTRACT

Antistatic agents for synthetic polymer materials have phosphonium sulfonate made from organic sulfonate anion and organic phosphonium cation of specified kinds as significant component and also contain alkali metal ions and/or alkali earth metal ions at total concentration of 0.1–300 ppm.

20 Claims, No Drawings

ANTISTATIC AGENT FOR SYNTHETIC POLYMER MATERIALS AND SYNTHETIC POLYMER COMPOSITIONS COMPRISING SAME

CLAIM FOR PRIORITY OF PRIOR APPLICATION

This application claims priority of prior Japan Application No. 2003-366797 filed on Oct. 28, 2003.

BACKGROUND OF THE INVENTION

This invention relates to antistatic agents for synthetic polymer materials and synthetic polymer compositions containing such agents. Synthetic polymer materials are generally hydrophobic and hence tend to become electrostatically charged. These characteristics serve as a big obstacle during their production process as well as when they are used. It is therefore an object of this invention in view of the above to provide antistatic agents for synthetic polymer materials and synthetic polymer compositions containing such agents.

Many kinds of ionic compounds have been used as antistatic agents for synthetic polymer materials. Among these ionic compounds, phosphonium sulfonate has been favorably considered for its superior compatibility with synthetic polymer materials and resistance against heat (as disclosed in Japanese Patent Publications Tokkai Sho-62-230835, Hei-1-14267 and Hei-1-62336 and U.S. Pat. No. 4,943,380). The kinds of phosphonium sulfonate which have been proposed, however, tend to adversely affect the natural hue or transparency of the synthetic polymer materials. Thus, there remains the problem that synthetic polymer compositions containing them are not suited for the production of products which are relatively thick and require a high level of transparency such as optical lenses and covers for lighting products. If the amount of phosphonium sulfonate to be used is reduced in order to limit the effects on the natural hue or transparency, however, the antistatic characteristic of products obtained from such a composition becomes poor especially under a condition of low humidity.

SUMMARY OF THE INVENTION

The problem, to which the present invention is addressed, is to provide antistatic agents capable of providing superior antistatic characteristics to synthetic polymer materials without adversely affecting the natural hue or transparency of the synthetic polymer materials and synthetic polymer compositions containing such agents.

DETAILED DESCRIPTION OF THE INVENTION

The invention, in one aspect, relates to an antistatic agent for synthetic polymer materials containing phosphonium sulfonate shown by Formula 1 given below as substantial component and containing also one or more kinds of metallic ions selected from the group consisting of alkali metal ions and alkali earth metal ions at concentration of 0.1–300 ppm:

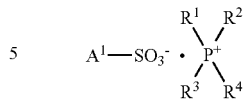

Formula 1 where $A^1$ is alkyl group with 1–24 carbon atoms, alkenyl group with 4–24 carbon atoms, phenyl group, phenyl group substituted by alkyl group with 1–18 carbon atoms, naphthyl group, and naphthyl group substituted by alkyl group with 1–18 carbon atoms; and $R^1$–$R^4$ are each aliphatic hydrocarbon group with 1–18 carbon atoms or aromatic hydrocarbon group.

In another aspect, the invention relates to a method of producing such an antistatic agent as described above, comprising what are herein referred to as the first process and the second process. The first process is for causing a double decomposition reaction of inorganic salt of organic sulfonic acid shown by Formula 2 given below:

$$A^1\text{-}SO_3M \qquad \text{Formula 2}$$

and organic phosphonium halide shown by Formula 3 given below:

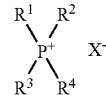

Formula 3 inside an aqueous solvent and separating an organic layer containing generated phosphonium sulfonate shown by Formula 1 from the aqueous solvent. The second process is for obtaining the antistatic agent as described above by washing the organic layer with water.

In Formulas 2 and 3, $A^1$ and $R^1$–$R^4$ are the same as those in Formula 1, M is an alkali metal or an alkali earth metal and X is a halogen atom.

In still another aspect, the invention relates to a synthetic polymer composition characterized as containing 0.1–5 weight parts of an antistatic agent of this invention as described above for 100 weight parts of a synthetic polymer material.

The antistatic agent according to this invention is explained more in detail. Firstly, it is characterized as containing phosphonium sulfonate shown by Formula 1 as substantial component. In the above, "substantial component" means that it is contained in an amount of 90 weight % or more but less than 100 weight %, and preferably within a range of 95 weight % or more and less than 100 weight %, and even more preferably within a range of 97 weight % or more and less than 100 weight %.

Phosphonium sulfonate shown by Formula 1 is formed from organic sulfonate anion and organic phosphonium cation. Examples of such organic sulfonate anion include (1) organic sulfonate anions having alkyl group with 1–24 carbon atoms such as methyl sulfonate, ethyl sulfonate, propyl sulfonate, butyl sulfonate, octyl sulfonate, decyl sulfonate, tetradecyl sulfonate, stearyl sulfonate, tetracosyl sulfonate and 2-ethylhexyl sulfonate; (2) organic sulfonate anions having alkenyl group with 4–24 carbon atoms such as butenyl sulfonate, octenyl sulfonate, dodecenyl sulfonate, tetradecenyl sulfonate and octadecenyl sulfonate; (3) phenyl sulfonate; (4) organic sulfonate anions having phenyl group substituted by alkyl group with 1–18 carbon atoms such as methyl phenyl sulfonate, butyl phenyl sulfonate, octyl phenyl sulfonate, dodecyl phenyl sulfonate, pentadecyl phenyl sulfonate, dibutyl phenyl sulfonate and dinonyl phenyl sulfonate; (5) naphthyl sulfonate; and (6) organic sulfonate anions having naphthyl group substituted by alkyl group with 1–18 carbon atoms such as diisopropyl naphthyl sulfonate and dibutyl naphthyl sulfonate. Among these, organic sulfonate anions having alkyl group with 6–18 carbons atoms, organic sulfonate anions having phenyl group substituted by alkyl group with 6–18 carbon atoms and organic sulfonate anions having naphthyl group substituted by alkyl group with 2–12 carbon atoms are preferred and organic sulfonate anions having phenyl group substituted by alkyl group with 9–16 carbon atoms are even more preferred.

Examples of organic phosphonium cation include (1) organic phosphonium cations having aliphatic hydrocarbon group with 1–18 carbon atoms such as tetramethyl phosphonium, tetraethyl phosphonium, tetrabutyl phosphonium, triethylbutyl phosphonium, tributylethyl phosphonium, diethyldihexyl phosphonium, dioctyldimethyl phosphonium, tributyloctyl phosphonium, tributyllauryl phosphonium, tributylhexadecyl phosphonium, tributylstearyl phosphonium, trimethyloctyl phosphonium, triethyloctyl phosphonium and trioctylbutyl phosphonium; and (2) organic phosphonium cations having aromatic hydrocarbon group such as tetraphenyl phosphonium, triphenylmethyl phosphonium, triphenylethyl phosphonium, triphenylbenzyl phosphonium and tributylbenzyl phosphonium. Among the above, organic phosphonium cations having aliphatic hydrocarbon group with 1–16 carbon atoms corresponding to $R^1$–$R^4$ in Formula 1 are preferred and organic phosphonium cations having aliphatic hydrocarbon group with 2–5 carbon atoms are even more preferred.

The antistatic agent of this invention contains phosphonium sulfonate shown by Formula 1 as substantial component and further contains metallic ions of a specified kind at concentration of 0.1–300 ppm and preferably 0.5–150 ppm. In the above, the specified kind means one or more selected from alkali metal ions and alkali earth metal ions. If there are two or more kinds of such ions, the total will be hereinafter referred to as the metallic ions. Examples of alkali metal ions include lithium ions, sodium ions, potassium ions, rubidium ions, cesium ions and francium ions. Examples of alkali earth metal ions include beryllium ions, magnesium ions, calcium ions, strontium ions, barium ions and radium ions. Of these metallic ions, however, alkali metal ions are preferred and sodium and/or potassium ions are particularly preferred.

It is further preferable that the pH value measured by using a mixture of water and ethanol at weight ratio of 50/50 to make a 1 weight % solution of the agent and by using glass electrode at 25° C. be 4.5–7.7 and more preferably 5.5–7.0. In what follows, pH values measured under such conditions will be simply referred to as the pH value.

Next, methods of producing such antistatic agents embodying this invention (hereinafter referred to as the methods of this invention) will be explained. Antistatic agents of this invention may be produced either (1) by adjusting the concentration of metallic ions during the process of producing phosphonium sulfonate shown by Formula 1 and further adjusting its pH value and (2) by producing phosphonium sulfonate shown by Formula 1 first, thereafter adding a metallic compound to form metallic ions with concentration within a specified range and thereafter adding a compound for adjusting the pH value. For both kinds (1) and (2) of methods, phosphonium sulfonate may be produced by (a) a double decomposition reaction of inorganic salt of organic sulfonic acid and organic phosphonium halide and (b) neutralizing organic sulfonic acid by using organic phosphonium hydroxide and a metallic compound for forming metallic ions. In the production method of this invention, a double decomposition reaction is carried out in a process of (1) by way of the aforementioned first and second processes.

The first process is wherein inorganic salt of organic sulfonic acid shown by Formula 2 and organic phosphonium halide shown by Formula 3 are caused to undergo a double decomposition reaction in an aqueous solvent and the organic layer containing phosphonium sulfonate shown by Formula 1 which is thereby generated is separated from the aqueous solvent. $A^1$ and $R^1$–$R^4$ in Formulas 2 and 3 are the same as those in Formula 1. M is either an alkali metal or an alkali earth metal and serves to form the aforementioned metallic ions as a result of the double decomposition reaction.

The second process is wherein the organic layer separated in the first process is washed with water so as to obtain an antistatic agent of this invention having phosphonium sulfonate shown by Formula 1 as its substantial component in the sense defined above and also containing metallic ions at concentration of 0.1–300 ppm or preferably 0.5–150 ppm with its pH value adjusted to 4.5–7.5 or preferably 5.5–7.0. The substantial component, metallic ions and the pH value mentioned above regarding the second process are the same as those mentioned regarding the antistatic agent embodying this invention.

The temperature of the water to be used for the washing in the second process is preferably 60–90° C. and its quantity is preferably 0.1–2.0 times, and more preferably 0.3–1.0 times the total quantity of the inorganic salt of organic sulfonate and the organic phosphonium halide that are used in the first process. The washing process is usually carried out, for example, by repeating 2–4 times in cycle the steps of stirring together the organic layer separated in the first process with washing water, leaving the mixture undisturbed for a while and thereafter removing the water layer. An antistatic agent of this invention having phosphonium sulfonate shown by Formula 1 as a significant component and metallic ions and its pH values adjusted within specified ranges can be obtained by thus washing with water the organic layer separated in the first process. For the purpose of ascertainment, the concentration of metallic ions and the pH value are checked on the organic layer after it is washed with water. If either the concentration of the metallic ions or the pH value is higher than their respective range, the washing process is further continued. If either of them is too low, a required amount of metallic compound or the like for forming metallic ions is added for adjustment. It is preferable to subject the organic layer to a dehydration process after it is washed with water in order to remove the remaining water.

Lastly, synthetic polymer compositions of this invention are explained. Synthetic polymer compositions of this invention are characterized as containing 0.1–5 weight parts, and preferably 1–3 weight parts of an antistatic agent of this invention described above per 100 weight parts of a synthetic polymer material. Such a synthetic polymer compositions of this invention may be produced by (1) a method of adding an antistatic agent of this invention during a polymerization process for the production of the synthetic polymer material, or by (2) a method of adding an antistatic agent of this invention to a synthetic polymer material during a molding process for the latter.

Examples of synthetic polymer material that may be used for the production of synthetic polymer compositions of this invention include (1) polycarbonate resins; (2) polyester resins such as polyethylene terephthalate, polybutylene terephthalate and polyethylene naphthalate; (3) polyphenylene ethers; (4) polyolefin resins such as polyethylene resins and polypropylene resins; (5) polyvinyl chloride resins; (6) polyoxymethylene resins; (7) polyphenylene sulfide resins; (8) polystyrene resins such as ABS resins, AS resins and HIPS resins; (9) acryl resins such as polymethyl methacrylate resins and methyl methacrylate-styrene resins; (10) polyamide resins; and (11) mixed resins of two or more of the above, but the present invention is particularly effective when applied to polycarbonate resins and methyl-methacrylate-styrene resins.

Synthetic polymer compositions of this invention may contain agents of other kinds, depending on the purpose for which they are used. Examples of agents of such other kinds include not only stabilizers such as antioxidants and ultraviolet light absorbers but also fire retarding agents, pigments and fillers of various kinds.

Antistatic agents of this invention are effective in providing superior antistatic characteristic to synthetic polymer materials without adversely affecting their natural hue and transparency. Production methods of this invention are advantageous wherein such antistatic agents can be produced efficiently. Compositions according to this invention are favorable because they have superior antistatic characteristic while keeping their natural hues and transparency.

The invention is described next in terms of four particular embodiments of antistatic agent and four particular embodiments of production method.

Embodiment 1: Antistatic agent (P-1) for synthetic polymer materials containing tetrabutyl phosphonium decylphenyl sulfonate by 99.0 weight % and sodium ions at concentration of 85 ppm and having pH value of 5.7.

Embodiment 2:

Antistatic agent (P-2) for synthetic polymer materials containing tetrabutyl phosphonium dodecylphenyl sulfonate by 98.7 weight % and sodium ions at concentration of 50 ppm and having pH value of 6.1.

Embodiment 3: Antistatic agent (P-3) for synthetic polymer materials containing tributylethyl phosphonium tridecylphenyl sulfonate by 98.0 weight % and potassium ions at concentration of 15 ppm and having pH value of 6.3.

Embodiment 4: Antistatic agent (P-4) for synthetic polymer materials containing triethylbutyl phosphonium pentadecylphenyl sulfonate by 97.5 weight % and potassium ions at concentration of 1.3 ppm and having pH value of 6.7.

Embodiment 5: Method of obtaining aforementioned antistatic agent (P-1) by causing double decomposition reaction between sodium decylphenyl sulfonate and tetrabutyl phosphonium chloride inside an aqueous solution, separating the organic layer thus obtained containing tetrabutyl phosphonium decylphenyl sulfonate from the aqueous solvent and thereafter washing the separated organic layer with water.

Embodiment 6: Method of obtaining aforementioned antistatic agent (P-2) by causing double decomposition reaction between sodium dodecylphenyl sulfonate and tetrabutyl phosphonium chloride inside an aqueous solution, separating the organic layer thus obtained containing tetrabutyl phosphonium dodecylphenyl sulfonate from the aqueous solvent and thereafter washing the separated organic layer with water.

Embodiment 7: Method of obtaining aforementioned antistatic agent (P-3) by causing double decomposition reaction between potassium tridecylphenyl sulfonate and tributylethyl phosphonium chloride inside an aqueous solution, separating the organic layer thus obtained containing tributylethyl phosphonium tridecylphenyl sulfonate from the aqueous solvent and thereafter washing the separated organic layer with water.

Embodiment 8: Method of obtaining aforementioned antistatic agent (P-4) by causing double decomposition reaction between potassium pentadecylphenyl sulfonate and triethylbutyl phosphonium chloride inside an aqueous solution, separating the organic layer thus obtained containing triethylbutyl phosphonium pentadecylphenyl sulfonate from the aqueous solvent and thereafter washing the separated organic layer with water.

The following two kinds of synthetic polymer compositions are presented as embodiments of the present invention.

Embodiment 9: Polycarbonate resin compositions containing 2.5 weight parts of any of aforementioned antistatic agents (P-1), (P-2), (P-3) or (P-4) for 100 weight parts of polycarbonate resin.

Embodiment 10: Methyl methacrylate-styrene resin compositions containing 2 weight parts of any of aforementioned antistatic agents (P-1), (P-2), (P-3) or (P-4) for 100 weight parts of methyl methacrylate-styrene resin.

Next, the invention will be described by way of test examples but it goes without saying that these examples are not intended to limit the scope of the invention. In what follows, "parts" will mean "weight parts" and "%" will mean "weight %".

Part 1: Preparation of Antistatic Agents for Synthetic Polymer Materials

TEST EXAMPLE 1

Sodium dodecylphenyl sulfonate (320 parts), tetrabutyl phosphonium chloride (310 parts) and water (500 parts) were placed inside a four-neck flask with a flush bottom valve provided with a thermometer, a stirrer and a reflux cooler. After the mixture was heated to 70–90° C. with stirring, a double decomposition reaction was carried out for one hour at the same temperature with stirring. After the stirring was discontinued, it was left undisturbed at the same temperature for 30 minutes and separated into an upper layer of solution containing tetrabutyl phosphonium decylphenyl sulfonate and a lower layer of aqueous solution by sedimentary separation. The lower layer of aqueous solution was discarded from the bottom, leaving the upper layer of solution containing tetrabutyl phosphonium decylphenyl sulfonate. Water (350 parts) was added to this solution containing tetrabutyl phosphonium decylphenyl sulfonate and after it was heated to 70–90° C. and stirred for one hour, the stirring was discontinued and it was left undisturbed at the same temperature for three hours for sedimentary separation. The lower layer of aqueous solution was discarded from the bottom and the remainder was washed with water. A similar washing process was repeated once again and the solution of tetrabutyl phosphonium decylphenyl sulfonate was subjected to a vacuum dehydration process for one hour at 115–125° C. and pressure of 5000–10000 Pa to obtain 529 parts of a yellowish transparent liquid. This yellowish transparent liquid was analyzed by means of high-speed liquid chromatography, atomic light absorption and pH meter and found to contain tetrabutyl phosphonium decylphenyl sulfonate by 99.0% and sodium ions at concentration of 85 ppm and to have the pH value of 5.7. This is referred to as antistatic agent (P-1).

TEST EXAMPLES 2–11

Antistatic agents (P-2)–(P-11) according to Test Examples 2–11 were prepared similarly to antistatic agent (P-1) of Test Example 1.

COMPARISON EXAMPLE 1

Antistatic agent (P-8) (100 parts) of Test Example 8 and water (80 parts) were placed inside a four-neck flask with a flush bottom valve provided with a thermometer, a stirrer and a reflux cooler. After the mixture was heated to 70–90° C. with stirring for one hour, the stirring was discontinued and it was left undisturbed at the same temperature for 3 hours for sedimentary separation. The lower layer of aqueous solution was discarded from the bottom and the remainder was washed with water. Water (80 parts) was added again, the temperature was raised to 70–90° C. and after it was stirred for one hour, the stirring was discontinued and it was left undisturbed for three hours for sedimentary separation. The lower layer of aqueous solution was discarded from the bottom and the remainder was washed with water. Next, a solution of triphenylmethyl phosphonium docosanyl sulfonate was subjected to a vacuum dehydration process for one hour at 115–125° C. and pressure of 5000–10000 Pa to obtain 92 parts of a yellowish transparent liquid. This yellowish transparent liquid was analyzed as in Test Example 1 and found to contain triphenylmethyl phosphonium docosanyl sulfonate by 98.7% and sodium ions at concentration of 0.05 ppm and to have the pH value of 6.0. This is referred to as antistatic agent (R-1).

COMPARISON EXAMPLE 2

Antistatic agent (P-9) (100 parts) of Test Example 9, water (100 parts) and 1% aqueous solution of potassium chloride (2.0 parts) were placed inside a four-neck flask with a flush bottom valve provided with a thermometer, a stirrer and a reflux cooler. After the mixture was stirred for one hour, it was subjected to a vacuum dehydration process as in Test Example 1, a yellowish transparent liquid (100 parts) was obtained. This yellowish transparent liquid was analyzed as in Test Example 1 and found to contain tetraphenyl phosphonium octadecenyl sulfonate by 97.6%, potassium ions at concentration of 340 ppm and to have the pH value of 5.8. This is referred to as antistatic agent (R-2).

COMPARISON EXAMPLE 3

Antistatic agent (R-3) of Comparison Example 3 was prepared similarly to antistatic agent (R-1) of Comparison Example 1.

COMPARISON EXAMPLE 4

Antistatic agent (R-4) of Comparison Example 4 was prepared similarly to antistatic agent (R-2) of Comparison Example 2.

Details of these antistatic agents are summarized in Table 1.

TABLE 1

| | Agent | $A^1$ | $R^1$ | $R^2$ | $R^3$ | $R^4$ | Phosphonium sulfonate shown by Formula 1 Content (%) | Metallic ions Kind/ppm | pH |
|---|---|---|---|---|---|---|---|---|---|
| Test Examples | | | | | | | | | |
| 1 | P-1 | DP | B | B | B | B | 99.0 | $Na^+$/85 | 5.7 |
| 2 | P-2 | DDP | B | B | B | B | 98.7 | $Na^+$/50 | 6.1 |
| 3 | P-3 | TDP | B | B | B | E | 98.0 | $K^+$/15 | 6.3 |
| 4 | P-4 | PDP | E | E | E | B | 97.5 | $K^+$/1.3 | 6.7 |
| 5 | P-5 | O | B | B | B | L | 99.5 | $Na^+$/0.8 | 7.0 |
| 6 | P-6 | PD | B | B | B | O | 98.2 | $K^+$/32 | 5.2 |
| 7 | P-7 | DIPN | B | B | B | HDM | 97.1 | $K^+$/135 | 6.1 |
| 8 | P-8 | DS | P | P | P | M | 98.3 | $Na^+$/0.2 | 6.2 |
| 9 | P-9 | OD | P | P | P | P | 98.8 | $K^+$/230 | 6.5 |
| 10 | P-10 | P | O | O | O | BZ | 97.5 | $Mg^{2+}$/0.4 | 4.7 |
| 11 | P-11 | N | O | O | O | M | 95.6 | $Ca^{2+}$/180 | 7.7 |
| Comparison Examples | | | | | | | | | |
| 1 | R-1 | DS | P | P | P | M | 98.7 | $Na^+$/0.05 | 6.0 |
| 2 | R-2 | OD | P | P | P | P | 97.6 | $K^+$/340 | 5.8 |
| 3 | R-3 | P | O | O | O | BZ | 97.9 | $Mg^{2+}$/0.07 | 5.5 |
| 4 | R-4 | N | O | O | O | M | 94.0 | $Ca^{2+}$/333 | 7.8 |

In Table 1:
DP: Decylphenyl group
DDP: Dodecylphenyl group
TDP: Tridecylphenyl group
PDP: Pentadecylphenyl group
O: Octyl group
PD: Pentadecyl group
DIPN: Diisopropylnaphthyl group
DS: Docosanyl group
OD: Octadecenyl group
P: Phenyl group
N: Naphthyl group
B: Butyl group
E: Ethyl group
L: Lauryl group
HDM: Hexadecyl group
M: Methyl group
BZ: Benzyl group Part 2: Preparation and Evaluation of Synthetic Polymer Compositions

TEST EXAMPLES 12–22 AND COMPARISON EXAMPLES 5–8

Polycarbonate resin (Iupilon S-3000F by Mitsubishi Engineering-Plastic Corporation) (100 parts) and each of the antistatic agents (of the kind and in the amount described in Table 2) were placed in Labo Plastomill (tradename by Toyo Seiki Seisakusho, Ltd.) and mixed together for 5 minutes at 280° C. to obtain synthetic polymer compositions. These synthetic polymer compositions were molded at 260° C. into sheets of thickness 10 mm. Specific surface resistance (herein abbreviated into "SSR") was measured on each of these sheets after humidity was adjusted for 24 hours within an air-conditioned room (a thermo-hygrostat) at 20° C. and 45% RH by means of a super megohm meter (Model SM-8210 by Toa Denpa Kogyo, Inc.) according to JIS-K6911 and evaluated as below. Their tinting strength and transparency (herein abbreviated into "TS" and "TR", respectively) were visually inspected and evaluated as below. The results are summarized in Table 2.

Evaluation of specific surface resistance (SSR):

AAA: Excellent, SSR being less than $5 \times 10^{12}$ Ω

AA: Good, SSR being $5 \times 10^{12}$ Ω or greater and less than $5 \times 10^{13}$ Ω.

A: Fair, SSR being $5 \times 10^{13}$ Ω or greater and less than $5 \times 10^{14}$ Ω.

B: Poor, SSR being $5 \times 10^{14}$ Ω or greater and less than $1 \times 10^{16}$ Ω.

C: Bad, SSR being $1 \times 10^{16}$ or greater.

Evaluation of tinting strength (TS):

AA: Same hue as the blanks which were produced in the same way except no antistatic agent was used.

A: Slightly stronger hue than the blanks.

B: Somewhat stronger hue than the blanks.

C: Significantly stronger hue than the blanks.

Evaluation of transparency (TR):

AA: About the same transparency as the blanks which were produced in the same way except no antistatic agent was used.

A: Slightly more turbid than the blanks.

B: Clearly more turbid than the blanks.

C: Significantly more turbid than the blanks.

TABLE 2

|  | Antistatic agent | | Evaluations | | |
|---|---|---|---|---|---|
| | Kind | Amount used (weight part) | SSR | TS | TR |
| Test Example | | | | | |
| 12 | P-1 | 2.5 | AAA | AA | AA |
| 13 | P-2 | 2.5 | AAA | AA | AA |
| 14 | P-3 | 2.5 | AAA | AA | AA |
| 15 | P-4 | 2.5 | AAA | AA | AA |
| 16 | P-5 | 2.0 | AA | A | AA |
| 17 | P-6 | 2.0 | AA | A | AA |
| 18 | P-7 | 2.0 | AA | A | AA |
| 19 | P-8 | 1.5 | A | A | AA |
| 20 | P-9 | 1.5 | A | A | A |
| 21 | P-10 | 4.0 | A | A | AA |
| 22 | P-11 | 4.0 | A | A | A |
| Comparison Example | | | | | |
| 5 | R-1 | 1.5 | B | B | AA |
| 6 | R-2 | 1.5 | A | B | B |
| 7 | R-3 | 4.0 | B | B | AA |
| 8 | R-4 | 4.0 | A | B | C |

TEST EXAMPLE 23–33 AND COMPARISON EXAMPLES 9–12

Methyl methacrylate-styrene resin (MS-200 by Nippon Steel Chemical Co., Ltd.) (100 parts) and each of the antistatic agents (of the kind and in the amount described in Table 3) were placed in Labo Plastomill (tradename by Toyo Seiki Seisakusho, Ltd.) and mixed together for 5 minutes at 220° C. to obtain synthetic polymer compositions. These synthetic polymer compositions were molded at 220° C. into sheets of thickness 10 mm. Specific surface resistance, tinting strength and transparency were measured and evaluated as described above on each of these sheets. The results are summarized in Table 3.

TABLE 3

|  | Antistatic agent | | Evaluations | | |
|---|---|---|---|---|---|
| | Kind | Amount used (weight part) | SSR | TS | TR |
| Test Example | | | | | |
| 23 | P-1 | 2.0 | AAA | AA | AA |
| 24 | P-2 | 2.0 | AAA | AA | AA |
| 25 | P-3 | 2.0 | AAA | AA | AA |
| 26 | P-4 | 2.0 | AAA | AA | AA |
| 27 | P-5 | 1.5 | AA | A | AA |
| 28 | P-6 | 1.5 | AA | A | AA |
| 29 | P-7 | 1.5 | AA | A | AA |
| 30 | P-8 | 1.0 | A | A | AA |
| 31 | P-9 | 1.0 | A | A | AA |
| 32 | P-10 | 4.5 | A | A | AA |
| 33 | P-11 | 4.5 | A | A | AA |
| Comparison Example | | | | | |
| 9 | R-1 | 1.0 | B | B | AA |
| 10 | R-2 | 1.5 | A | B | A |
| 11 | R-3 | 4.5 | B | B | AA |
| 12 | R-4 | 4.5 | A | B | A |

What is claimed is:

1. An antistatic agent for synthetic polymer materials containing phosphonium sulfonate shown by Formula 1 as substantial component and containing one or more kinds of metallic ions selected from the group consisting of alkali metal ions and alkali earth metal ions at concentration of 0.1–300 ppm, Formula 1 being:

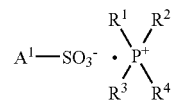

where $A^1$ is alkyl group with 1–24 carbon atoms, alkenyl group with 4–24 carbon atoms, phenyl group, phenyl group substituted by alkyl group with 1–18 carbon atoms, naphthyl group, and naphthyl group substituted by alkyl group with 1–18 carbon atoms; and $R^1$–$R^4$ are each aliphatic hydrocarbon group with 1–18 carbon atoms or aromatic hydrocarbon group.

2. The antistatic agent of claim 1 containing said phosphonium sulfonate shown by Formula 1 in an amount of 95 weight % or more and less than 100 weight %.

3. The antistatic agent of claim 1 containing said phosphonium sulfonate shown by Formula 1 in an amount of 97 weight % or more and less than 100 weight %.

4. The antistatic agent of claim 1 containing said metallic ions at concentration of 0.5–150 ppm.

5. The antistatic agent of claim 4 wherein said metallic ions are selected from the group consisting of sodium ion and potassium ion.

6. The antistatic agent of claim 5 of which a 1 weight % solution in a mixed solvent consisting of water and methanol at a weight ratio of 50/50 has a pH value of 4.5–7.5 when measured by using a glass electrode at 25° C.

7. The antistatic agent of claim 6 wherein $A^1$ is alkyl group with 6–18 carbon atoms, phenyl group substituted by alkyl group with 6–18 carbon atoms, or naphthyl group substituted by alkyl group with 2–12 carbon atoms, and $R^1$–$R^4$ are each aliphatic hydrocarbon group with 1–16 carbon atoms.

8. The antistatic agent of claim 6 wherein $A^1$ is phenyl group substituted by alkyl group with 9–16 carbon atoms, and $R^1$–$R^4$ are each aliphatic hydrocarbon group with 2–5 carbon atoms.

9. A method of producing the antistatic agent of claim 1, said method comprising:
   a first process for causing a double decomposition reaction of inorganic salt of organic sulfonic acid shown by Formula 2 and organic phosphonium halide shown by Formula 3 inside a water solvent and separating an organic layer containing generated phosphonium sulfonate shown by said Formula 1 from said water solvent; and
   a second process for obtaining the antistatic agent of claim 1 by washing said organic layer with water;
   wherein Formula 2 is $A^1\text{-SO}_3M$ and Formula 3 is

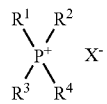

where $A^1$ and $R^1$–$R^4$ in Formulas 2 and 3 are the same as those in Formula 1, M is an alkali metal of an alkali earth metal and X is a halogen atom.

10. The method of claim 9 wherein said second process is for washing said organic layer and thereby obtaining the antistatic agent of claim 1 containing phosphonium sulfonate shown by Formula 1 by 97 weight % or more and less than 100 weight % and said metallic ions at concentration of 0.5–150 ppm.

11. The method of claim 10 wherein said second process further includes the step of preparing a 1 weight % solution of said organic layer in a mixed solvent consisting of water and methanol at a weight ratio of 50/50 so as to have a pH value of 4.5–7.5 when measured by using a glass electrode at 25° C.

12. The method of claim 11 wherein M in Formula 2 is sodium ion or potassium ion.

13. The method of claim 12 wherein $A^1$ in Formula 2 is alkyl group with 6–18 carbon atoms, phenyl group substituted by alkyl group with 6–18 carbon atoms, or naphthyl group substituted by alkyl group with 2–12 carbon atoms, and $R^1$–$R^4$ in Formula 3 are each aliphatic hydrocarbon group with 1–16 carbon atoms.

14. The method of claim 12 wherein $A^1$ in Formula 2 is phenyl group substituted by alkyl group with 9–16 carbon atoms, and $R^1$–$R^4$ in Formula 3 are each aliphatic hydrocarbon group with 2–5 carbon atoms.

15. A synthetic polymer composition containing 0.1–5 weight parts of the agent of claim 1 for 100 weight parts of a synthetic polymer material.

16. A synthetic polymer composition containing 0.1–5 weight parts of the agent of claim 4 for 100 weight parts of a synthetic polymer material.

17. A synthetic polymer composition containing 0.1–5 weight parts of the agent of claim 5 for 100 weight parts of a synthetic polymer material.

18. A synthetic polymer composition containing 0.1–5 weight parts of the agent of claim 6 for 100 weight parts of a synthetic polymer material.

19. A synthetic polymer composition containing 0.1–5 weight parts of the agent of claim 7 for 100 weight parts of a synthetic polymer material.

20. A synthetic polymer composition containing 0.1–5 weight parts of the agent of claim 8 for 100 weight parts of a synthetic polymer material.

* * * * *